(12) United States Patent
Boam et al.

(10) Patent No.: US 9,309,483 B2
(45) Date of Patent: Apr. 12, 2016

(54) MEMBRANE-BASED PROCESSES FOR REDUCING AT LEAST ONE IMPURITY AND MAKING A CONCENTRATE COMPRISING AT LEAST ONE NATURAL COMPONENT FROM A NON-MARINE FATTY ACID OIL MIXTURE, AND COMPOSITIONS RESULTING THEREOF

(71) Applicant: EVONIK MEMBRANE EXTRACTION TECHNOLOGY LTD., Greater London (GB)

(72) Inventors: Andrew Boam, Hitchin (GB); Henrik Fismen, Sandefjord (NO); Velichka Yordanova Koleva, Wembley (GB); Fui Wen Lim, Hitchin (GB); Maria Ines Fontes Rocha, London (GB); Sverre Sondbo, Sandefjord (NO); Eddy G. Torp, Oslo (NO)

(73) Assignee: EVONIK MEMBRANE EXTRACTION TECHNOLOGY LTD., Greater London (GB)

( * ) Notice: Subject to any disclaimer, the term of this patent is extended or adjusted under 35 U.S.C. 154(b) by 0 days.

(21) Appl. No.: 14/357,117

(22) PCT Filed: Nov. 8, 2012

(86) PCT No.: PCT/EP2012/072103
§ 371 (c)(1),
(2) Date: May 8, 2014

(87) PCT Pub. No.: WO2013/068443
PCT Pub. Date: May 16, 2013

(65) Prior Publication Data
US 2014/0296549 A1  Oct. 2, 2014

Related U.S. Application Data

(60) Provisional application No. 61/557,577, filed on Nov. 9, 2011.

(51) Int. Cl.
  *C11C 3/00* (2006.01)
  *C11B 3/00* (2006.01)
  *A23D 9/04* (2006.01)
  (Continued)

(52) U.S. Cl.
  CPC . *C11B 3/008* (2013.01); *A23D 9/04* (2013.01); *B01D 61/027* (2013.01); *C11B 3/00* (2013.01); *C11B 3/001* (2013.01); *C11B 3/10* (2013.01); *B01D 2311/04* (2013.01);
  (Continued)

(58) Field of Classification Search
  None
  See application file for complete search history.

(56) References Cited

U.S. PATENT DOCUMENTS 7,923,052 B2 *  4/2011  Jirjis et al. .................... 426/662
2003/0209493 A1 * 11/2003  Koseoglu et al. ............. 210/651
(Continued)

OTHER PUBLICATIONS

Desai, et al., Degumming of vegetable oil by membrane technology, 2002, Indian Journal of Chemical Technology, vol. 9, pp. 529-534.*
(Continued)

*Primary Examiner* — Yate K Cutliff
(74) *Attorney, Agent, or Firm* — Oblon, McClelland, Maier & Neustadt, L.L.P.

(57) ABSTRACT

The present disclosure relates generally to processes for reducing impurities and separating natural components from a non-marine fatty acid oil mixture using at least one selective membrane, and compositions thereof.

17 Claims, 4 Drawing Sheets

(51) Int. Cl.
 C11B 3/10 (2006.01)
 B01D 61/02 (2006.01)
(52) U.S. Cl.
 CPC ........ *B01D 2315/10* (2013.01); *B01D 2315/16* (2013.01); *B01D 2317/025* (2013.01)

(56) References Cited

U.S. PATENT DOCUMENTS

2005/0130281 A1 6/2005 Both et al.
2010/0130761 A1* 5/2010 Boam et al. ............... 554/21

OTHER PUBLICATIONS

Lin, et al., Bench-scale membrane degumming of crude vegetable oil, 1997, Journal of Memberane Science, vol. 134, pp. 101-108.*
Zwijnenberg, et al., Acetone-stable nanofiltration membranes in deacidifying vegetable oil, 1999, JAOCS, vol. 76, No. 1, pp. 83-87.*
Johnson, L.A., et al., Comparision of Alternative Solvents for Olls Extraction, 1983, JAOCS, vol. 60, No. 2, pp. 229-242.*
Kaparthi, R. et al., Solubilities of vegetable oils in aqueous ethanol and ethanol-hexane mixtures, 1959, The Journal of American Oil Chemist's Society, vol. 36, pp. 77-80.*
Allegre, C. et al., "Cholesterol removal by nanofiltration: Applications in nutraceutics and nutritional supplements", Journal of Membrane Science, vol. 269, No. 1-2, pp. 109-117, (Feb. 1, 2006) XP024931306.
Jala, R. C. R. et al., "Separation of FFA from Partially Hydrogenated Soybean Oil Hydrolysate by Means of Membrane Processing", Journal of the American Oil Chemists, vol. 88, No. 7, pp. 1053-1060, (Feb. 12, 2011) XP019919434.
Koike, S. et al., "Separation of Oil Constituents in Organic Solvents Using Polymeric Membranes", Journal of the American Oil Chemists, vol. 79, No. 9, pp. 937-942, (Jan. 1, 2002) XP001537765.
Cheryan, M., "Membrane technology in the vegetable oil industry", Membrane Technology, vol. 2005, No. 2, pp. 5-7, (Feb. 1, 2005) XP027676993.
International Search Report Issued Mar. 27, 2013 in PCT/EP12/072103 Filed Nov. 8, 2012.
Written Opinion of the International Searching Authority Issued Mar. 27, 2013 in PCT/EP12/072103 Filed Nov. 8, 2012.
Written Opinion of the Intellectual Property Office of Singapore (IPOS) mailed Apr. 10, 2015, in Singapore Application No. 11201402192W, filed Nov. 8, 2012.

* cited by examiner

MEMBRANE-BASED PROCESSES FOR REDUCING AT LEAST ONE IMPURITY AND MAKING A CONCENTRATE COMPRISING AT LEAST ONE NATURAL COMPONENT FROM A NON-MARINE FATTY ACID OIL MIXTURE, AND COMPOSITIONS RESULTING THEREOF

CROSS REFERENCE TO RELATED APPLICATIONS

The present application is a 35 U.S.C. §371 national stage patent application of International patent application PCT/EP2012/072103, filed on Nov. 8, 2012, published as WO/2013/068443 on May 16, 2013, the text of which is incorporated by reference, and claims the benefit of the filing date of U.S. Provisional application No. 61/557,577, filed on Nov. 9, 2011, the text of which is also incorporated by reference.

The present disclosure relates generally to a process for (1) reducing at least one impurity, i.e., undesirable natural components, and undesirable synthetic materials or (2) making a concentrate comprising at least one natural component from a non-marine fatty acid oil mixture such as a triglyceride or phospholipid oil using at least one selective membrane.

A number of uses of synthetic membranes in fatty acid oil mixture processing have been described in the literature.

Several workers have described the use of synthetic membranes, specifically ultrafiltration membranes, to remove phospholipids from certain types of triacylglyceride oils (for instance U.S. Pat. No. 5,310,487; U.S. Pat. No. 5,545,329; U.S. Pat. No. 6,797,172; de Carvalho et al. (2006), Desalination, 200, pp. 543-545; de Souza et al (2008), Journal of Food Engineering, 86, pp. 557-564; Akin et al, (2012) Critical Reviews in Food Science and Nutrition, 52, pp. 347-371). In this process, a volume of organic solvent (typically hexane) is added to the oil to form miscella with the phospholipids. The miscella aggregate the phospholipids at the interface between the solvent and triacylglyceride oil, leading to miscella that are typically tens of nanometers in diameter (sometimes the size of miscella is also quoted in terms of molecular weights of tens of thousands). Both ceramic and polymeric ultrafiltration membranes with molecular weight cut-off above 5,000 Da have been applied to this process. As the miscella are large compared to the triacylglycerides, the phospholipid miscella are retained by the membrane and the triacylglyceride content passes through the membrane. Ultrafiltration membranes are applied to provide practical and economic permeation rates of the triacylglyceride oil. Some variations of this basic process have been published, for example the use of membranes to degum and deacidify vegetable oil (*Membrane-based simultaneous degumming and deacidification of vegetable oils*, Innovative Food Science and Emerging Technologies 6 (2005) 203-212), however the key aspect of these processes is that the membrane retains the phospholipid miscella and the triacylglyceride passes through the membrane.

The application of microfiltration membranes to fatty acid oil mixture processing has also been described. WO0208368A1 describes the use of microfiltration membranes to remove particulates from a crude vegetable oil. WO0208368A1 also teaches the use of a glass, nylon or nylon plus glass filter to remove cationic species, particularly DNA, from the crude oil.

A number of other workers describe the use of filtration combined with other unit operations to effect a desired separation.

For instance, US20110195168A1 describes the formation of a diatomaceous earth material and the use of this material to enhance filtration or form a filter. This type of filter addresses the problem of removing fine particulates from oil. A secondary effect of this process is that a limited range of impurities may also adsorb to the filter material—e.g. the filter media may be diatomaceous earth as described in US20110195168A1, it may also be clay and silica as described in U.S. Pat. No. 5,229,013, or it may be a mix of polystyrene divinylbenzene particles and functionalized silica particles as described in U.S. Pat. No. 6,165,519.

Another adsorption technique described in the art, PCT/NO2007/000385, teaches the use of a carbon adsorbent to remove persistent bio-accumulating toxins, e.g. PCBs, from natural oils. The process described in PCT/NO2007/000385 combines adsorption with a membrane filtration, specifically a ceramic ultrafiltration membrane, to separate the carbon adsorbent from the solution. In this process, the adsorbent affects the removal of impurities from the oil and the membrane is specifically used to separate the adsorbent from the oil.

Moreover, U.S. Patent Application No. 2010/0130761 (WO 2008/002154) describes the use of membranes for deacidifying fish oil and other glyceride oils. This disclosure utilizes the fact that free fatty acids are more easily dissolved in immiscible alcohol solvents (e.g. ethanol) than triglycerides to produce an extract enriched in free fatty acids. In addition to the free fatty acids a portion of the triglyceride oil also dissolves in the alcohol solvent. A nanofiltration membrane is used to separate the free fatty acids from the triglyceride oil in the ethanolic extract to maximize recovered yield of the triglyceride oil. A low molecular weight cut-off polyimide membrane (molecular weight cut-off below 400 g·mol$^{-1}$) is selected in this process to allow permeation of the free fatty acids but retain triglycerides. In WO'154 deacidifying of the crude fish oil is done via solvent extraction. Further work up of the residue of the extraction process is necessary to obtain the purified fish oil. Membrane filtration is only used for work up of the side product stream. Thus, this process is not very efficient and there remains a need for a more economical process to obtain highly purified phospholipid and triglyceride oils from crude oils.

Allègre et al. (*Cholesterol removal by nanofiltration: Applications in nutraceutics and nutritional supplements*, Journal of Membrane Science 269 (2006) 109-117) describe a process similar to U.S. Patent Application No. 2010/0130761 (WO 2008/002154). Allègre et al. disclose the use of ethanol to selectively extract target lipid compounds from egg yolk, followed in a second step by applying nanofiltration membranes to fractionate the lipid compounds from cholesterol. This work does not teach the direct treatment with nanofiltration membranes of the feed material (egg yolk in this case) dissolved in solvent to remove cholesterol, rather it teaches that at least two distinct separation unit operations must be carried out in order to affect the desired separation. Thus, there remains a need for a simpler, more efficient process to affect direct separation of lipid compounds from cholesterol and other impurities.

Crude triglyceride oils commonly undergo pre-treatment processing to deliver oil having the desired content of free fatty acids, color, odor, and/or taste. Pre-treatment processing of crude triglyceride oil typically includes three process steps of deacidification, bleaching, and deodorization. Each pre-treatment processing step produces a loss of oil, and further processing steps may be necessary to remove undesirable impurities.

Triglyceride and phospholipid oils such as plant-based oils, microbial oils, and algae oils may be sources of valuable fatty acids, such as omega-3, omega-6 and omega-9 fatty acids. Omega-3 fatty acids in particular are useful in a number of applications, including in pharmaceutical and/or nutritional supplement products.

Several formulations of omega-3 fatty acids have been developed. For example, one form of omega-3 fatty acid oil mixture is a concentrate of primary omega-3, long chain, polyunsaturated fatty acids from fish oil containing DHA and EPA, such as those sold under the trademark Omacor®/Lovaza™/Zodin®/Seacor®. See, for example, U.S. Pat. Nos. 5,502,077, 5,656,667, and 5,698,594. In particular, each 1000 mg capsule of Lovaza™ contains at least 90% omega-3 ethyl ester fatty acids (84% EPA/DHA); approximately 465 mg EPA ethyl ester and approximately 375 mg DHA ethyl ester.

There thus remains a need in the art for a more efficient process for removing impurities from a non-marine fatty acid oil mixture such as a triglyceride or phospholipid oil. Disclosed herein is a process which may achieve the combined effect of one, two, or all three of the pre-treatment process steps of deacidification, bleaching, and deodorization in a single process, with the added effect of removing impurities such as, for example, cholesterol and/or environmental pollutants. The disclosed process therefore may simplify the pre-treatment of a non-marine fatty acid oil mixture while improving oil yield and quality. Additionally, the process may be used for making a concentrate comprising at least one natural component.

The present disclosure generally relates to a process for reducing at least one impurity from a non-marine fatty acid oil mixture comprising: (a) mixing the non-marine fatty acid oil mixture with an organic solvent to form a solution; (b) passing the solution across at least one selective membrane, wherein a retentate forms comprising oil content, and a permeate forms comprising at least one impurity; and (c) removing the organic solvent from the retentate to form a purified non-marine oil, wherein the at least one impurity in the purified non-marine oil is reduced compared to the non-marine fatty acid oil mixture, wherein the non-marine fatty acid oil mixture comprises triglyceride oils, phospholipid oils, and any combination thereof and wherein the membrane used is characterized by a rejection $R_{TG}$ of the target compounds triglyceride oils, phospholipid oils and/or mixture thereof, which is greater than the membrane rejection of the impurities $R_{Imp}$. Thus, the major amounts of triglyceride oils and phospholipid oils are retained by the membrane.

For example, the present disclosure relates to a process for reducing at least one impurity from a non-marine triglyceride oil comprising: (a) mixing the non-marine triglyceride oil with an organic solvent to form a solution, wherein the organic solvent is chosen from ethyl acetate, isopropanol, and acetone; (b) passing the solution across at least one selective membrane, wherein the at least one selective membrane has a molecular weight cut-off ranging from about 200 g/mol to about 800 g/mol, wherein a retentate forms comprising oil content, and a permeate forms comprising the at least one impurity; and (c) removing the organic solvent from the retentate to form a purified oil, wherein the triglyceride oil comprises di- and triglycerides and the process is performed at a temperature ranging from 30° C. to 50° C.

The present disclosure further relates to a process for making a concentrate comprising at least one natural component from a non-marine fatty acid oil mixture, comprising: (a) mixing the non-marine fatty acid oil mixture with an organic solvent to form a solution; (b) passing the solution across at least one selective membrane, wherein a retentate forms comprising oil content and a permeate forms comprising the at least one natural component; and (c) removing the organic solvent from the permeate to form a concentrate comprising the at least one natural component, wherein the at least one natural component is chosen from fat soluble vitamins A, D or E, cholesterol, phytosterols, other sterols, lipophilic hormones, astaxanthin, cantaxanthin, beta-carotene, xanthophylls, other carotenoids and other fat-soluble colored components, and the non-marine fatty acid oil mixture is chosen from triglyceride oils, phospholipid oils, and any combination thereof.

It is to be understood that both the foregoing general description and the following detailed description are exemplary and explanatory only and are not restrictive of the disclosure, as claimed.

DESCRIPTION

Figure 1:
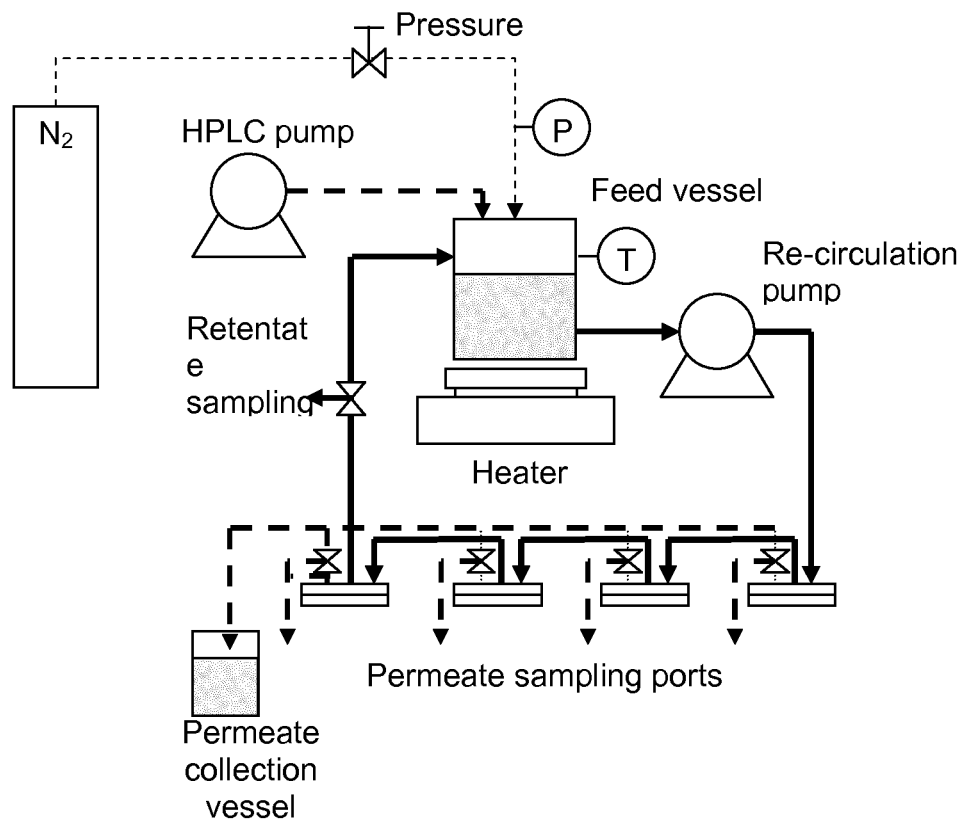
FIG. 1 is a schematic of the cross-flow nanofiltration system, as described in Example 1.

Particular aspects of the disclosure are described in greater detail below. The terms and definitions as used in the present application and as clarified herein are intended to represent the meaning within the present disclosure. The patent and scientific literature referred to herein and referenced above is hereby incorporated by reference. The terms and definitions provided herein control, if in conflict with terms and/or definitions incorporated by reference.

The singular forms "a," "an," and "the" include plural reference unless the context dictates otherwise.

"%" means "% by weight" unless the context dictates otherwise.

The terms "approximately" and "about" mean to be nearly the same as a referenced number or value. As used herein, the terms "approximately" and "about" should be generally understood to encompass ±30% of a specified amount, frequency or value.

As used herein the term "acid value" of a fat or an oil means the amount of free acids presented in a fat or an oil equal to the number of milligrams of potassium hydroxide needed to neutralize one gram of the oil, i.e. that the term serves as an index of the efficiency of refining. This means that a high acid value is characteristic for low quality oil or fat products.

The term "fatty acid(s)" includes, e.g., short-chain and long-chain saturated and unsaturated (e.g., monounsaturated and polyunsaturated) hydrocarbons comprising one carboxylic acid group.

The terms "omega-3 fatty acid(s)", "omega-6 fatty acid(s)" and "omega-9 fatty acid(s)" represent sub-classes of "fatty acids" and include natural and synthetic respectively omega-3, omega-6 and omega-9 fatty acids.

The terms "omega-3 fatty acid(s) oil" and "omega-6 fatty acid(s) oil" and "omega-9 fatty acid(s) oil" represent sub class of "fatty acid oils".

Omega-3 fatty acid(s) oil includes at least one of the following compounds: natural and synthetic omega-3 fatty acids, pharmaceutically-acceptable esters, free acids, triglycerides, derivatives, conjugates (see, e.g., Zaloga et al., U.S.

Publication No. 2004/0254357, and Horrobin et al., U.S. Pat. No. 6,245,811, each hereby incorporated by reference), precursors, salts, and mixtures thereof. Examples of omega-3 fatty acid oils include, but are not limited to, omega-3 polyunsaturated fatty acids such as α-linolenic acid (ALA, 18:3n-3), octadecatetraenoic acid (i.e., stearidonic acid, STA, 18:4n-3), eicosatrienoic acid (ETE, 20:3n-3), eicosatetraenoic acid (ETA, 20:4n-3), eicosapentaenoic acid (EPA, 20:5n-3), heneicosapentaenoic acid (HPA, 21:5n-3), docosapentaenoic acid (DPA, dupanodonic acid, 22:5n-3), and docosahexaenoic acid (DHA, 22:6n-3); and esters of omega-3 fatty acids with glycerol such as mono-, di- and triglycerides; and esters of the omega-3 fatty acids and a primary, secondary, and/or tertiary alcohol, such as, for example, fatty acid methyl esters and fatty acid ethyl esters.

Omega-6 fatty acid oil(s) includes at least one of the following compounds: natural and synthetic omega-6 fatty acids, as well as pharmaceutically-acceptable esters, free acids, triglycerides, derivatives, conjugates, precursors, salts, and mixtures thereof. Examples of omega-6 fatty acid oils include, but are not limited to, omega-6 polyunsaturated, long-chain fatty acids such as linoleic acid (18:2n-6), γ-linolenic acid (18:3n-6), eicosadienoic acid (20:2n-6), dihomo-γ-linolenic acid (20:3n-6), arachidonic acid (20:4n-6), docosadienoic acid (22:2n-6), adrenic acid (22:4n-6), and docosapentaenoic acid (i.e., osbond acid, 22:5n-6); and esters, triglycerides, derivatives, conjugates, precursors, salts, and/or mixtures thereof.

Omega-9 fatty acid oil(s) includes at least one of the following compounds: natural and synthetic omega-9 fatty acids, as well as pharmaceutically-acceptable esters, free acids, triglycerides, derivatives, conjugates, precursors, salts, and mixtures thereof. Examples of omega-9 fatty acid oils include, but are not limited to, omega-9 polyunsaturated, long-chain fatty acids such as oleic acid (18:1n-9), elaidic acid (18:1 n-9), eicosenoic acid (20:1n-9), mead acid (20:3n-9), erucic acid (22:1n-9), nervonic acid (24:1n-9) and esters, triglycerides, derivatives, conjugates, precursors, salts, and/or mixtures thereof.

The term "non-marine fatty acid oil(s)" or "non-marine based fatty acid oil(s)", both terms are used analogously in the present invention, includes all kinds of non-marine originating oils comprising triglyceride oils, phospholipid oils or mixture thereof. "Non-marine originating" means that the oil was obtained from species neither living nor growing in an ocean, respectively salt water. "Non marine fatty acid oils" have therefore to be distinguished from "marine oils" respectively "marine based oil", both terms are used analogously in the present invention, which are derived from species, for examples animals or plants living in the sea or in salt water. The terms "non-marine (based) fatty acid oil(s)" and "non-marine oils" are used equivalently in the present application and have the same meaning. Analogously the terms "marine fatty acid oil(s)" and "marine oils" are used equivalently.

The terms "natural (origin) compound" or "natural (origin) components" is used in the present invention to define a non synthetic compounds being present as an impurity in the non-marine fatty acid oil. Some of these natural compounds may be used for human or animal nutrition or for other purposes. Thus, it might be of interest to isolate the natural compounds, too. In the process of the present invention, these natural compounds cross the membrane together with other impurities and are concentrated in the permeate. If there are useful natural compounds in the concentrated (permeate) solution, the permeate may be removed and commercialized or further processed. Said part of the present invention involves an added value to the production of the target compound, i.e. the purified non-marine oil. Thus, the present invention also comprises a process wherein a concentrate of said natural component is produced and removed as a product or an intermediate product for further processing. Not covered by the term "natural compound" or "natural components" are glyceride oil, phospholipid oils and fatty acids.

Non-Marine Fatty Acid Oil Mixture

A non-marine fatty acid oil mixture such as a triglyceride or phospholipid oil according to the present disclosure are non-marine oil(s), including non-marine animal and/or non-animal oil(s) or non-marine oils derived thereof from any of these oils. In some embodiments of the present disclosure, the non-marine fatty acid oil mixture comprises at least one oil chosen from animal fat or oil, single cell oils, algae oil, plant-based oil, microbial oil, and combinations thereof.

The oils used in the present invention have to be distinguished from marine oils including, for example, oil originating from fish, shellfish, krill or other crustaceans, squid, marine mammals, marine algae, zooplankton, and lipid composition derived from fish.

Plant-based non-marine oils include, for example, flaxseed oil, canola oil, mustard seed oil, and soybean oil. Single cell/microbial oils include, for example, products by Martek, Nutrinova, and Nagase & Co. Single cell oils are often defined as oils derived from microbial cells and which are destined for human consumption. See, e.g., Wynn and Ratledge, "Microbial oils: production, processing and markets for specialty long-chain omega-3 polyunsatutrated fatty acids," pp. 43-76 in Breivik (Ed.), *Long-Chain Omega-3 Specialty Oils*, The Oily Press, P.J. Barnes & Associates, Bridgewater UK, 2007.

In some embodiments, the non-marine fatty acid oil mixture used in the present invention comprises at least one vegetable oil obtained from vegetables not living or growing in the sea. Non-marine vegetable oils include triglyceride vegetable oils, commonly known as long chain triglycerides such as castor oil, corn oil, cottonseed oil, olive oil, peanut oil, safflower oil, sunflower oil, sesame oil, soybean oil, hydrogenated soybean oil, and hydrogenated vegetable oils; and medium chain triglycerides such as those derived from coconut oil or palm seed oil. In addition, some speciality vegetable oils can be produced from grain or seeds from a wide range of plants. Such oils include wheat oil, pumpkin seed oil, linseed oil, grape seed oil, blackberry seed oil, nut oils, and various other oils. Thus, in at least one embodiment, the non-marine fatty acid mixture comprises a vegetable oil chosen from palm oil, soybean oil, rapeseed oil, sunflower oil, peanut oil, cottonseed oil, palm kernel oil, coconut oil, olive oil, corn oil, grape seed oil, hazelnut oil, linseed oil, rice bran oil, safflower oil, sesame oil, almond oil, pecan oil, pistachio oil, walnut oil, castor oil, and jojoba oil. Furthermore the non-marine oil may be a phospholipid oil or contain phospholipid(s). Phospholipids, often found in substances known as "lecithin(s)" include compounds such as phosphatidylcholine, phosphatidylethanolamine, and phosphatidylinositol. Non-marine sources of phospholipids include soy beans, sunflower and egg yolk.

In other embodiments of the present disclosure, the non-marine fatty acid oil mixture comprises at least one non-marine animal fat or oil, such as milk or butter fat, or fat-containing tissue or organs from animals such as, for instance, cattle, pig, sheep, or poultry. For special applications, such as separation of hormones, fat from human organs might also be used. The non-marine fat can also be fat from lamb or sheep's wool, which might contain insecticides to be removed. A non-limiting example of non-marine oil includes oils from non-marine algae.

In further embodiments of the present disclosure, the non-marine fatty acid oil mixture comprises oil originating from non-marine originating bacteria or yeasts (such as, for example, from a fermentation process).

The non-marine fatty acid oil mixture used in the present invention comprises triglyceride oils and/or phospholipid oils, or any combination thereof. Further, the non-marine fatty acid oil mixture may comprise greater than 20%, preferably greater than 30%, particular preferred greater than 40%, very particular preferred greater than 60%, especially preferred greater than 60%, triglycerides and/or phospholipid oils. The upper limit of the triglyceride and/or phospholipid oil content is preferably 95%, particular preferred 90% and very particular preferred 80%. In very special embodiments the non-marine fatty acid oil mixture already comprises more than 80% and most preferred more than 90% triglycerides and/or phospholipid oils. The triglyceride oils may contain free fatty acids, as well as mono- and diglycerides from hydrolysis of the triglycerides. Mono-glycerides, however, are considered to be impurities in the present invention. The preferred target product comprises as main components di- and triglycerides and/or phospholipids, depending on the crude oil. Preferably the content of di- and triglycerides and/or phospholipids in the purified oil is greater than 90%, particularly preferred 96 to 99% or greater than 99%.

In some embodiments, the non-marine fatty acid oil mixture may have an acid value of greater than or equal to 10 mg KOH/g. For example, in at least one embodiment, the acid value of the non-marine fatty acid oil mixture ranges from 10 to 25 mg KOH/g. In other embodiments, the non-marine fatty acid oil mixture may have an acid value ranging from 0 to 25 mg KOH/g.

The process of the invention is particular suitable to deacidify a crude non-marine fatty acid oil mixture with high glyceride or phospholipide content, as defined in the paragraphs before, via a membrane process and not via extraction as described in the prior art, for example in WO 2008/002154. The process is therefore much simpler and more efficient than the processes known so far.

In a special embodiment, the non-marine fatty acid oil mixture comprises at least from about 10% to about 30% by weight of omega-3 fatty acids.

Membrane

Suitable selective membranes for use according to the present disclosure include polymeric and ceramic membranes, and mixed polymeric/inorganic membranes. Membrane rejection, $R_i$, is a term of art defined as:

$$R_i = \left(1 - \frac{C_{P,i}}{C_{R,i}}\right) \times 100\% \quad (1)$$

wherein $C_{P,i}$=concentration of species i in the permeate, "permeate" being the liquid which has passed through the membrane, and $C_{R,i}$=concentration of species i in the retentate, "retentate" being the liquid which has not passed through the membrane. It will be appreciated that a membrane is suitable for the process disclosed herein if R(non-marine fatty acid oil mixture)>R(impurities). Since triglyceride oils, phospholipid oils and mixtures thereof are the target compounds (TG), $R_{TG}$ must be greater than $R_{Imp}$.

The at least one selective membrane according to the present disclosure may be formed from any polymeric or ceramic material which provides a separating layer capable of separating the desired oil content from at least one natural impurity and/or synthetic impurity present in the non-marine fatty acid oil mixture. For example, the at least one selective membrane may be formed from or comprise a material chosen from polymeric materials suitable for fabricating microfiltration, ultrafiltration, nanofiltration, or reverse osmosis membranes, including polyethylene, polypropylene, polytetrafluoroethylene (PTFE), polyvinylidene difluoride (PVDF), polysulfone, polyethersulfone, polyacrylonitrile, polyamide, polyimide, polyamideimide, polyetherimide, cellulose acetate, polyaniline, polypyrrole, polyetheretherketone (PEEK), polybenzimidazole, and mixtures thereof. The at least one selective membrane can be made by any technique known to the art, including sintering, stretching, track etching, template leaching, interfacial polymerization, or phase inversion. In at least one embodiment, the at least one selective membrane may be crosslinked or treated so as to improve its stability in the process solvents. For example, non-limiting mention may be made of the membranes described in GB2437519, the contents of which are incorporated herein by reference.

In at least one embodiment, the at least one selective membrane is a composite material comprising a support and a thin, non-porous, selectively permeable layer. The thin, non-porous, selectively permeable layer may, for example, be formed from or comprise a material chosen from modified polysiloxane based elastomers including polydimethylsiloxane (PDMS) based elastomers, ethylene-propylene diene (EPDM) based elastomers, polynorbornene based elastomers, polyoctenamer based elastomers, polyurethane based elastomers, butadiene and nitrile butadiene rubber based elastomers, natural rubber, butyl rubber based elastomers, polychloroprene (Neoprene) based elastomers, epichlorohydrin elastomers, polyacrylate elastomers, polyethylene, polypropylene, polytetrafluoroethylene (PTFE), polyvinylidene difluoride (PVDF) based elastomers, polyetherblock amides (PEBAX), polyurethane elastomers, crosslinked polyether, polyamide, polyaniline, polypyrrole, and mixtures thereof.

In another embodiment, the at least one selective membrane is prepared from an inorganic material such as, for example, silicon carbide, silicon oxide, zirconium oxide, titanium oxide, and zeolites, using any technique known to those skilled in the art such as sintering, leaching, or sol-gel processing.

In a further embodiment, the at least one selective membrane comprises a polymer membrane with dispersed organic or inorganic matrices in the form of powdered solids present at amounts up to 20 wt % of the polymer membrane. Carbon molecular sieve matrices can be prepared by pyrolysis of any suitable material as described in U.S. Pat. No. 6,585,802. Zeolites as described in U.S. Pat. No. 6,755,900 may also be used as an inorganic matrix. Metal oxides, for example, titanium dioxide, zinc oxide, and silicon dioxide may be used, such as the materials available from Evonik Industries AG (Germany) under their AEROSIL and ADNANO trademarks. Mixed metal oxides such as mixtures of cerium, zirconium, and magnesium oxides may also be used. In at least one embodiment, the matrices will be particles less than about 1.0 micron in diameter, for example less than about 0.1 microns in diameter, such as less than about 0.01 microns in diameter.

In at least one embodiment, the at least one selective membrane comprises two membranes. In another embodiment, the at least one selective membrane comprises three membranes.

In at least one embodiment, the at least one selective membrane comprises a nanofiltration membrane. As used herein, the term "nanofiltration" means membrane filtration which separates particles having molar masses ranging from about 150 to about 1,500 Da. In at least one embodiment, the pressure ranges from about 0.5 MPa to about 7 MPa.

In at least one embodiment, the at least one selective membrane has a molecular weight cut-off ranging from about 150 g/mol to about 1,500 g/mol. For the purposes of this application, molecular weight cut-off is defined according to the methodology of See-Toh et al (2007) (Journal of Membrane Science, 291 (1-2), pp. 120-125), where the molecular weight cut-off is taken to be the molecular weight at which 90% rejection is achieved of a series of styrene oligomers. In a preferred embodiment, the at least one selective membrane has a molecular weight cut-off ranging from about 200 g/mol to about 700 g/mol, particularly preferred 300-600 g/mol.

Particularly good results have been found in the process of the present invention if the selective membrane is a hydrophobic membrane. For the purposes of this application, "Hydrophobic" means that the selective membrane should provide a contact angle for water of more than 70° at 25° C., as measured using the static sessile drop method described in ASTM D7334. Preferred selective membranes have a contact angle for water of more than 70° at 25° C. Especially preferred are selective membranes having a contact angle for water of more than 90° at 25° C.

Particularly preferred hydrophobic membranes of the present invention are polyimide membranes, particularly preferred made of P84 (CAS No. 9046-51-9) and P84HT (CAS No. 134119-41-8) and/or mixtures thereof. The polyimide membranes optionally may be crosslinked according to GB2437519. To avoid lengthy text repetitions the content of GB 2437519 is herewith incorporated by reference to the description of present application as a whole. Also particular preferred in the present invention are organic coated polyimide membranes, particularly preferred made of above mentioned crosslinked or non-crosslinked P84 and/or P84HT membranes. Very good results have been achieved with crosslinked or non-crosslinked, coated polyimide membranes, especially made of P84 and/ P84HT and/or mixtures thereof, wherein the coating comprises silicone acrylates. Particular preferred silicone acrylates to coat the membranes are described in U.S. Pat. No. 6,368,382, U.S. Pat. No. 5,733, 663, JP 62-136212, P 59-225705, DE102009047351 and in EP 1741481 A1. To avoid lengthy repetitions the contents of both patent applications are incorporated by reference to the present application. They are part of the description and in particular of the claims of the present invention. In particular preferred in the present invention is the combination of the especially prefered polyimides mentioned above with the silicone acrylates claimed in DE102009047351 and in EP 1741481 A1. These combinations are part of the claim of the present invention.

Impurities

The process of the present invention is used to purify non marine oils from impurities. The term "impurities" includes, but is not limited to, for example, undesirable natural and unnatural components present in the crude oil. "Undesirable" means impurities that are not "harmful" for humans or animals but not wanted in the target product. Examples are colourants or compounds causing bad taste or bad smell, etc. "Impurities", however, also comprise natural and unnatural components present in the crude oil which are unsuited for human consumption or animal feed, i.e. which are for example harmful or cause bad taste or bad smell, etc. In particular impurities are compounds having a regulatory limit for human consumption, for example because they would bioaccumulate and could provide toxic, mutagenic, carcinogenic, etc. effects over time.

Explicitly not regarded as impurities in the present invention are di- and triglycerides, phospholipids and fatty acids.

The process disclosed herein, thus, describes separating impurities from a non-marine fatty acid oil mixture, resulting in an oil having impurity levels within desired and/or regulatory limits for, for instance, human consumption.

The concentration and composition of the impurities found in the non-marine fatty acid oil mixture can vary. For example, it may vary based on geography, species, etc. In some instances, the impurities may be absent or below the detection limit, but if the oil is concentrated, the impurities may also be concentrated. Additionally, the methods (e.g., the analytical methods) used to determine the level or concentration of the impurities found in the non-marine fatty acid oil mixture as well as the purified oil vary with regard to the limit of detection and limit of quantification. Although established methods, i.e. validated methods, may be available for some of the impurities, they may not be for others.

Further non-limiting examples of impurities are free and/or esterified cholesterol, colored components, oxidation products, Vitamins A, D and E (like alpha- beta- and gamma tocopherol and tocotrienols), phytosterols, other sterols, lipophilic hormones, monoglycerides, astaxanthin, canthaxanthin, other carotenoids, xanthophylls, and components that create unwanted smell and taste in the oil, such as aldehydes and/or ketones. In at least one embodiment, the removal of colored components results in an oil having improved color, and removal of components that create unwanted smell and taste result in an oil having an improved taste profile.

When the non-marine fatty acid oil mixture is chosen from non-marine oil, such as vegetable or animal oils, "impurities" may include phytosterols (from vegetable oils), cholesterol (from animal source oils), lipophilic hormones, and natural colors, for instance belonging to the carotenoids. In at least one embodiment, the process disclosed herein produces a reduction in the level of at least one impurity in the purified oil ranging from 50% to about 100%, in particular a reduction of about 70% to 100% and especially 80% to 100%. In very preferred embodiments a reduction in the level of at least one impurity in the purified oil ranging from 70% to about 99%, compared to the non-marine fatty acid oil mixture. In another embodiment, the process disclosed herein produces a permeate comprising an increased concentration of at least one component chosen from fat soluble vitamins, phytosterols, cholesterol, lipophilic hormones, astaxanthin, canthaxanthin, beta-carotene, xanthophylls, other carotenoids and other fat-soluble colored components, relative to the non-marine fatty acid oil mixture. For example, in at least one such embodiment, the process produces an increased concentration of at least one component chosen from astaxanthin, phytosterols, Vitamin E, Vitamin D and Vitamin A, relative to the non-marine fatty acid oil mixture.

One important class of impurities is environmental pollutants. Non-marine oils from polluted areas may contain, for example, high levels of environmental pollutants that make the oil unsuited for human consumption or animal feed. The process of the invention can effectively remove a wide range of environmental pollutants from such oils, thereby producing oils suitable for human consumption or use as animal and/or fish feed from highly polluted oils.

The term "environmental pollutants" includes, but is not limited to, for example, polychlorinated biphenyls (PCBs), polybrominated diphenyl ethers (PBDEs), agrochemicals (including chlorinated pesticides), polycyclic aromatic hydrocarbons (PAHs), hexachlorocyclohexanes (HCHs), dichlorodiphenyltrichloroethane (DDT), dioxins, furans, and nonortho-PCBs.

"Polycyclic aromatic hydrocarbons" or "PAHs" comprise fused aromatic rings which do not contain heteroatoms or carry substituents. As non-limiting examples of PAHs, mention may be made of acenaphthene, acenaphthylene, anthracene, benzo[a]pyrene, benz[a]anthracene, chrysene, coronene, corannulene, fluorene, fluoranthene, tetracene, naphthalene, pentacene, phenanthrene, pyrene, triphenylene, indeno(1,2,3-cd)pyrene, dibenz[az/ah]anthracene, benzo[ghi]perylene, and ovalene. According to one embodiment, the untreated oil comprises PAHs such as benzo[a]pyrene, anthracene, and/or pyrene. For example, the untreated oil may comprise 0.3 ng/g benzo[a]pyrene, 0.1 ng/g antracene, and/or 2-4 ng/g pyrene.

"Dioxins" refers to dioxin congeners, such as, for example, 12378-PCDD, 2378-TCDD, 123478-HCDD, 123678-HCDD, 123789-HCDD, and 1234678-HCDD. In at least one embodiment, the process disclosed herein produces a reduction of about 80% to about 99% in dioxins in the purified oil compared to the non-marine fatty acid oil mixture.

"Furans" includes, for example, dibenzofurans, including the following congeners having 4, 5, 6, or 7 chlorine atoms: 2378-TCDF, 12378/12348-PeCDF, 23478-PeCDF, 123478/123479-HxCDF, 123678-HxCDF, 123789-HxCDF, 234678-HxCDF, 1234678-HpCDF, and 1234789-HpCDF.

"Polychlorinated biphenyls" or "PCBs" includes 209 different PCB congeners, including, for instance, congener numbers 18 (2,2',5-trichlorobiphenyl), 28 (2,4,4'-trichlorobiphenyl), 31 (2,4',5-trichlorobiphenyl), 33 (2',3,4-trichlorobiphenyl), 37 (3,4,4'-trichlorobiphenyl), 47 (2,2'4,4'-tetrachlorobiphenyl), 52 (2,2',5,5'-tetrachlorobiphenyl), 66 (2,3',4,4'-tetrachlorobiphenyl), 74 (2,4,4',5-tetrachlorobiphenyl), 99 (2,2'4,4',5-pentachlorobiphenyl), 101 (2,2',4,5,5'-pentachlorobiphenyl), 105 (2,3,3',4,4'-pentachlorobiphenyl) 114 (2,3,4,4',5-pentachlorobiphenyl), 118 (2,3',4,4',5-pentachlorobiphenyl), 122 (2',3,3',4,5-pentachlorobiphenyl), 123 (2',3,4,4',5-pentachlorobiphenyl), 128 (2,2',3,3',4,4'-hexachlorobiphenyl), 138 (2,2',3,5,4',5'-hexachlorobiphenyl), 141 (2,2',3,5,5'-hexachlorobiphenyl), 149 (2,2',3,4',5',6-hexachlorobiphenyl), 153 (2,2',4,4',5,5'-hexachlorobiphenyl), 157 (2,3,3',4,4',5'-hexachlorobiphenyl) 167 (2,3',4,4',5,5'-hexachlorobiphenyl), 170 (2,2',3,3',4,4',5-heptachlorobiphenyl), 180 (2,2',3,4,4',5,5'-heptachlorobiphenyl), 183 (2,2',3,4,4',5',6-heptachlorobiphenyl), 187 (2,2',3,4',5,5',6-heptachlorobiphenyl), 189 (2,3,3',4,4',5,5'-heptachlorobiphenyl), 194 (2,2',3,3',4,4',5,5'-octachlorobiphenyl), 206 (2,2',3,3',4,4',5,5',6-nonachlorobiphenyl), and 209 (decachlorobiphenyl). According to one embodiment, the non-marine fatty acid oil mixture comprises PCBs in concentrations of 5-20 ng/g. In at least one embodiment, the process disclosed herein produces a purified oil comprising a maximum concentration of about 3 ng/g of a total concentration of PCBs. For example, in at least one embodiment, the purified oil comprises a maximum concentration of about 1 ng/g of a sum of the concentrations of PCB 28, PCB 52, PCB 101, PCB 118, PCB 153, PCB 138, and PCB 180.

"Nonortho-PCBs" includes, for example, 33'44'-TeCB (PCB-77), 344'5-TeCB (PCB-81), 33'44'5-PeCB (PCB-126), and 33'44'55'-HCB (PCB-169). In at least one embodiment, the process disclosed herein produces a purified oil comprising a maximum concentration of about 30 ng/g of a sum of the concentrations of non-ortho PCB 77, non-ortho PCB 81, non-ortho PCB 126, and non-ortho PCB 169.

"Polybrominated diphenyl ethers" or "PBDEs" includes 209 different congeners, including, for instance congener numbers 28 (2,4,4'-tribromodiphenyl ether), 47 (2,2',4,4'-tetrabromodiphenyl ether), 66 (2,3',4,4'-tetrabromodiphenyl ether), 49+71 (2,2',4,5'+2,3',4',6-tetrabromodiphenyl ether), 77 (3,3',4,4'-tetrabromodiphenyl ether), 85 (2,2',3,4,4'-pentabromodiphenyl ether), 99 (2,2',4,4',5-pentabromodiphenyl ether), 100 (2,2'4,4',6-pentabromodiphenyl ether), 119 (2,3',4,4',6-penbromodiphenyl ether), 138 (2,2',3,4,4',5'-hexbromodiphenyl ether), 153 (2,2',4,4',5,5'-hexabromodiphenyl ether), 154 (2,2',4,4',5,6'-hexabromodiphenyl ether), 183 (2,2',3,4,4',5',6-heptabromodiphenyl ether), 196 (2,2',3,3',4,4',5,6'-octabromodiphenyl ether), 206 (2,2',3,3',4,4',5,5',6'-nonabromodiphenyl ether), and 209 (decabromodiphenyl ether). According to one embodiment, the non-marine fatty acid oil mixture comprises PBDBs in concentrations of 0.1-3 ng/g. In at least one embodiment, the process disclosed herein produces a purified oil comprising a maximum concentration of about 0.1 ng/g of PBDE 47. In another embodiment, the process disclosed herein produces a purified oil comprising a maximum concentration of about 0.05 ng/g of PBDE 99. In yet another embodiment, the process disclosed herein produces a purified oil comprising a maximum concentration of about 0.05 ng/g of PBDE 100. In a further embodiment, the process disclosed herein produces a purified oil comprising a maximum concentration of about 0.5 ng/g of PBDE 209. In yet another embodiment, the process disclosed herein produces a purified oil comprising a maximum concentration about 0.1 ng/g of a sum of the concentrations of PBDE 47, PBDE 99, and PBDE 100. In at least one embodiment, the process disclosed herein produces a purified oil comprising a maximum concentration of about 0.1 ng/g of a sum of the concentrations of PBDE 28, PBDE 47, PBDE 49, PBDE 71, PBDE 99, PBDE 100, and PBDE 154.

The non-marine fatty acid oil mixture may comprise various impurities in various concentrations. For example, in at least one embodiment, the non-marine fatty acid oil mixture may comprise any or all of the following:

PBDE 47 in a concentration ranging from about 0.1 ng/g to about 5 ng/g,
PBDE 99 in a concentration ranging from about 0.05 ng/g to about 5 ng/g,
PBDE 100 in a concentration ranging from about 0.05 ng/g to about 5 ng/g,
PBDE 209 in a concentration ranging from about 0.05 ng/g to about 5 ng/g,
a sum of concentrations of PBDE 47, PBDE 99, and PBDE 100 ranging from about 0.1 ng/g to about 10 ng/g,
a sum of concentrations of PBDE 28, PBDE 47, PBDE 49, PBDE 71, PBDE 99, PBDE 100, and PBDE 154 ranging from about 0.2 ng/g to about 20 ng/g,
a total PCB concentration ranging from about 5 ng/g to about 1000 ng/g,
a sum of concentrations of PCB 28, PCB 52, PCB 101, PCB 105, PCB 118, PCB 138, PCB 153, and PCB 180 ranging from about 2 ng/g to about 300 ng/g, and/or
a sum of concentrations of non-ortho PCB 77, non-ortho PCB 81, non-ortho PCB 126, and non-ortho PCB 169 ranging from about 20 pg/g to about 1700 pg/g.
a sum of dioxins (Sum PCDD, TE 2005) ranging from about 0.2 pg/g to about 20 pg/g.

"Hexachlorocyclohexanes" or "HCHs" includes, for example, the following forms: alpha-HCH, beta-HCH, gamma-HCH, and delta-HCH.

"DDT" refers to, for example, the following forms: o,p'-DDE, p,p'-DDE, o,p'-DDD, p,p'-DDD, o,p'-DDT, and p,p'-DDT.

"Chlorinated pesticides" includes, for example, lindane, endrin, dieldrin, aldrin, isodrin, heptachlor-exo-epoxide, heptachlor-endo-epoxide, trans-chlordane, cis-chlordane, oxy-chlordane, chlordane, heptachlor, endosulfan-1, and mirex.

According to one embodiment, "environmental pollutants" includes, for example, DDT, and/or chlorinated pesticides such as lindane, and endrin. For instance, the non-marine fatty acid oil mixture may comprise 10-100 ng/g DDT (total), 0.1-1 ng/g lindane, and/or 3 ng/g endrin.

The above examples of impurities and impurity levels, however, are intended to be non-limiting. As discussed herein, the types and amounts of impurities in non-marine oils vary significantly with geography, seasons, pollution, etc. The disclosed process may be used to reduce impurities in non-marine fatty acid oil mixtures comprising impurities at far greater levels than those disclosed above: for instance, non-marine fatty acid oil mixtures comprising impurities at 20 times the levels listed above.

Process for Reducing at Least One Impurity and Process for Making a Concentrate Comprising at Lease One Natural Component Some embodiments of the present disclosure relate to a process for reducing impurities from a non-marine fatty acid oil mixture such as a triglyceride or phospholipid oil using at least one selective membrane. Additionally, some embodiments of the present disclosure relate to a process for making a concentrate comprising at least one natural component from a non-marine fatty acid oil mixture such as a triglyceride or phospholipid oil using at least one selective membrane According to one embodiment, the non-marine fatty acid oil mixture is mixed with an organic solvent to form a solution of oil and solvent. The mixing may be achieved by any technique known to one skilled in the art, such as, for example, via static inline mixer, dynamic inline mixer, and/or mixing vessel containing a mechanical stirrer. In at least one embodiment, the solvent is miscible with the non-marine fatty acid oil mixture and forms a solution, such as a homogeneous solution. For example, the solution may contain the oil in an amount ranging from 1 to 60% v/v, such as from 5 to 50% v/v.

The term "organic solvent" includes, for example, an organic liquid with molecular weight less than 300 Daltons. The term "solvent" includes a mixture of organic solvents, as well as a mixture of organic solvents and water.

By way of non-limiting example, solvents include aromatics, alkanes, ketones, glycols, chlorinated solvents, esters, ethers, amines, nitriles, aldehydes, alcohols, phenols, amides, carboxylic acids, alcohols, furans, and dipolar aprotic solvents, and mixtures thereof and with water.

By way of non-limiting example, solvents include toluene, xylene, benzene, styrene, anisole, chlorobenzene, dichlorobenzene, chloroform, dichloromethane, dichloroethane, methyl acetate, ethyl acetate, butyl acetate, methyl ether ketone (MEK), methyl iso butyl ketone (MIBK), acetone, ethylene glycols, ethanol, methanol, propanol, butanol, hexane, cyclohexane, heptane, dimethoxyethane, methyl tert butyl ether (MTBE), diethyl ether, adiponitrile, N,N dimethylformamide, dimethylsulfoxide, N,N dimethylacetamide, dioxane, nitromethane, nitrobenzene, pyridine, carbon disulfide, tetrahydrofuran, methyl-tetrahydrofuran, N-methyl pyrrolidone, N-ethyl pyrrolidone, acetonitrile, and mixtures thereof and with water.

Very good results have been achieved when the solvent is selected from aliphatic hydrocarbons, aromatic hydrocarbons, ketones, esters, and alcohols. Particularly preferred solvents are selected from pentane, hexane, heptane, toluene, acetone, methyl ethyl ketone, methyl acetate, ethyl acetate, propyl acetate, butyl acetate, iso-propanol, butanol, pentanol. Very particular preferred solvents are selected from hexane, acetone, ethyl acetate and isopropanol and especially preferred solvents are acetone, ethyl acetate and isopropanol.

Separation of the impurities, especially undesirable natural and synthetic impurities, may be achieved through passing the solvent-oil solution across at least one selective membrane that retains the desired oil content, i.e. in the form of a retentate, and allows permeation of the undesirable impurities, i.e. in the form of a permeate. A driving force, e.g. an applied pressure, is used to permeate content through the membrane. In at least one embodiment, the applied pressure ranges from 1 to 100 bar. For example, the applied pressure may range from 5 to 70 bar, such as from 15 to 60 bar.

In a preferred embodiment, the present disclosure provides a process for reducing impurities, in particular undesirable natural components (e.g., cholesterol, oxidation products, and colored components) and/or undesirable synthetic materials (e.g., dioxins, PCBs, PBDEs, PAHs, agrochemicals), present in a triglyceride or phospholipid oil by mixing the oil and a suitable solvent and applying membrane filtration, comprising the steps of: (i) providing a solution of the oil dissolved in a solvent; (ii) providing a selectively permeable membrane having a first surface and a second surface; (iii) separating the oil from the undesirable species in solution by transferring the undesirable species from the first surface to the second surface across the membrane through contact of the oil solution with the first surface, wherein the pressure at the first surface is greater than the pressure at the second surface, and wherein the membrane is a selectively permeable membrane such that the membrane rejection ($R_{TG}$) of the oil species is greater than the rejection ($R_{Imp.}$) of the undesirable species.

As indicated before, the disclosed method can also be used to make a concentrate comprising at least one natural component, such as fat soluble vitamins like Vitamin A, D and E, lipophilic hormones, phytosterols, other sterols, cholesterol, astaxanthin, canthaxanthin, beta-carotene, xanthophylls, other carotenoids, and/or colored components, from a non-marine fatty acid oil mixture using the disclosed selective membranes, resulting in the formation of a concentrate comprising the at least one natural component. The non-marine fatty acid oil mixture containing at least one natural component, may for example comprise an oil originating from bacteria or yeasts (such as from a fermentation process).

If the membrane rejection of the desired component to be concentrated ($R_{des}$) is less than the membrane rejection of the triglyceride or phospholipid oil, then the permeate will become enriched with the desired component, i.e., forming a concentrate of the at least one natural component.

In a preferred embodiment, the oil solution is contacted with the first surface of the membrane by flowing the solution tangentially across the first surface. This is commonly known as "cross flow" filtration or "tangential flow" filtration. As a result, the oil content is retained as the retentate, and impurities permeate through the at least one selective membrane to form permeate material. In one embodiment, the non-marine fatty acid oil solution is contacted with at least one surface of at least one selective membrane, for instance, two or three selective membranes. By way of non-limiting example, the non-marine fatty acid oil solution may first be contacted with one surface of the first selective membrane to remove impurities that permeate through this first membrane, then the retentate comprising the non-marine fatty acid oil content from the first selective membrane is contacted with a first surface of a second selective membrane to remove impurities that permeate through this second membrane. The selected first and second membranes may be the same, or the selected membranes may be different in order to effect permeation of different impurities with the different membranes. It will be understood by one skilled in the art that contacting the non-marine fatty acid oil solution with three or more selective membranes may be necessary to provide the desired product.

In a further embodiment, the non-marine fatty acid oil solution may be contacted with a first surface of a first selective membrane to generate a retentate comprising the non-marine fatty acid oil content and a permeate depleted in non-marine fatty acid oil. The permeate may contain sufficient concentration of the non-marine fatty acid oil that the permeate solution from the first selective membrane is then contacted with the first surface of a second selective membrane to generate a further retentate comprising the non-marine fatty acid oil content and a permeate stream containing the impurities. It will be clear to one skilled in the art that by processing the first permeate solution with a second membrane, the yield of the desirable non-marine fatty acid oil solution will be increased. Furthermore, it will be clear to one skilled in the art that process configurations including both a series of selective membranes processing the non-marine fatty acid oil solution and retentate comprising the non-marine fatty acid oil content and a series of selective membranes processing the permeate solution from any other selective membranes are feasible.

Thus, in at least one embodiment, the process disclosed herein further comprises (d) mixing the retentate with an organic solvent to form a retentate solution; (e) passing the retentate solution across the at least one selective membrane, wherein a second retentate forms comprising oil content, and a second permeate forms comprising at least one impurity; and (f) removing the organic solvent from the second retentate to form a second purified oil. In yet another embodiment, the process disclosed herein further comprises (d) mixing the permeate with an organic solvent to form a permeate solution; and (e) passing the permeate solution across the at least one selective membrane, wherein a second retentate forms comprising oil content, and a second permeate forms comprising at least one impurity.

In at least one embodiment, repetition of the process of mixing, passing, and removing may continue for a period of time ranging from about 10 minutes to about twenty hours. For example, in one embodiment, repeating the process of mixing, passing, and removing continues for a period of time ranging from about 30 minutes to about five hours. When tangential flow filtration (sometimes also referred to as cross-flow filtration) is used to pass the solution across the surface of at least one selective membrane, the process may comprise a linear velocity at the membrane surface ranging from about 0.1 m/s to about 5 m/s, such as, for example, from about 0.5 m/s to about 3 m/s.

In the process disclosed herein, diafiltration is preferably used to enhance the removal of impurities from the non-marine fatty acid oil solution. Diafiltration is known to those skilled in the art and is the process whereby fresh solvent is added to a solution undergoing filtration to enhance the quantity of lower molecular weight species that permeate through the membrane. Diafiltration is a liquid filtration process in which a feed liquid containing at least two solutes is in contact with a membrane and is pressurized so that some fraction of the liquid passes through the membrane, wherein at least one solute has a higher rejection on the membrane than at least one other solute. Additional liquid is fed to the pressurized side of the membrane to make up for the liquid permeating through the membrane. The ratios between the concentration of the more highly retained solute and the concentration of the less retained solute in the permeate and retentate varies dynamically, increasing in the retentate and decreasing in the permeate. Thus, in at least one embodiment, the passing of the solution across the at least one selective membrane comprises diafiltration.

A very particular preferred method for the present invention is a combination of cross-flow and diafiltration. Compared to other known processes like dead-end filtration, the preferred process of the present invention provides several advantages like: less fouling; less material loss, longer life time of the apparatus. In sum a higher efficiency can be achieved.

Optionally, any remaining solvent content in the retentate is removed, resulting in the formation of a purified oil. The purified oil may then be optionally treated with at least one adsorption process comprising at least one absorbent or adsorbent to remove additional components and/or remaining impurities. For instance, in at least one embodiment, the purified oil is treated with activated carbon or another appropriate absorbent or adsorbent such as forms of silica, which, for example, may remove dioxins remaining in the product.

Figure 2:
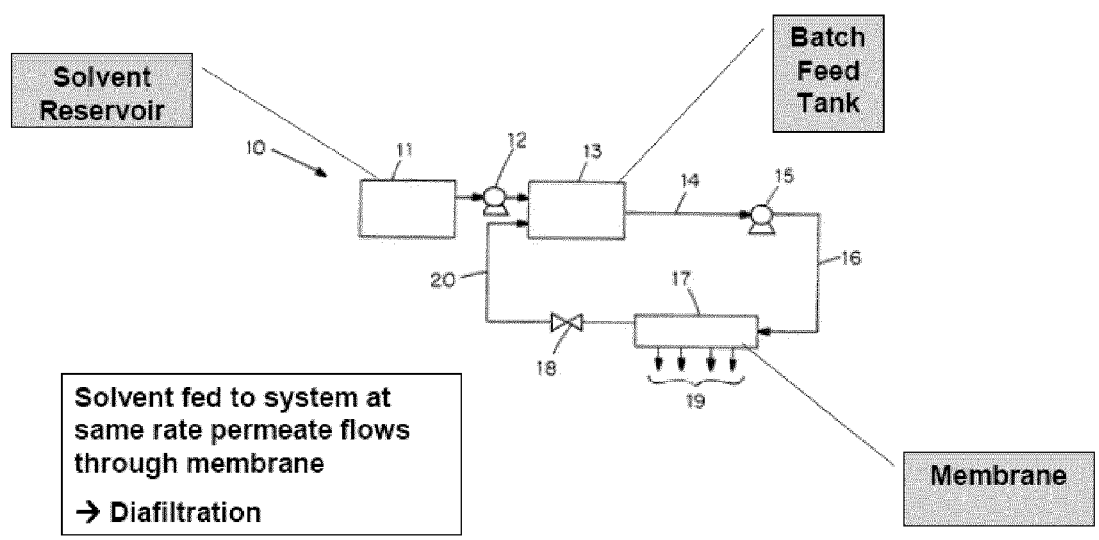
FIG. 2 is a schematic of an embodiment of the diafiltration system disclosed herein.

For example, a diafiltration system is illustrated in FIG. 2. First a batch of the non-marine fatty acid oil mixture solution to be processed is fed into tank 13. Pump 15 is then used to circulate the non-marine fatty acid oil mixture solution (14 and 16) to a membrane module housing (17) in which a module containing a suitable membrane for the separation is located. The driving force for the separation is generated by a back-pressure valve (18), which provides a filtration pressure that maintains a trans-membrane pressure difference that allows a portion of the feed fluid to transport through the membrane to generate a permeate stream (19) and a retentate stream (20). The retentate stream (20) is returned to the feed tank (13). In order to maintain a constant volume in this system, solvent is fed from reservoir 11 to feed tank 13 by pump 12 at the same rate as liquid is permeating through the membrane (19). By applying this process, impurities are flushed through the membrane whilst the oil content is retained, thus generating a purified oil.

Figure 3:
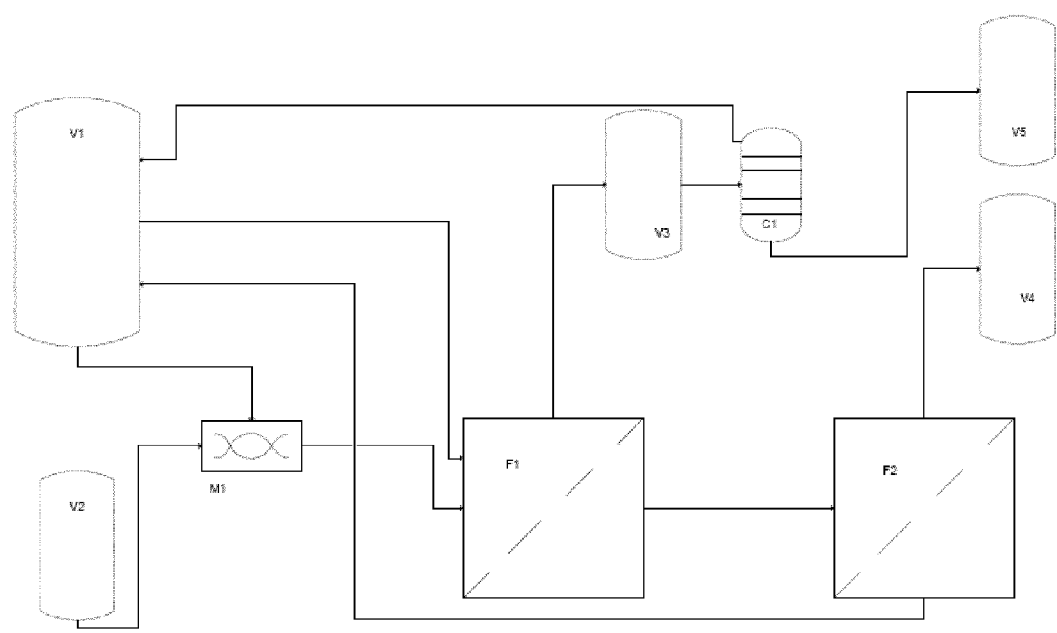
FIG. 3 is a schematic of a variation of the diafiltration system disclosed herein.

Another variation of a diafiltration system is represented in FIG. 3. In this schematic, V1 represents a storage vessel for the organic solvent; V2 represents a storage vessel for the non-marine fatty acid oil mixture feed; V3 represents a storage vessel for the solution of the processed non-marine fatty acid oil mixture (retentate); V4 represents a storage vessel for the solution of impurities removed from the non-marine fatty acid oil mixture (permeate); V5 represents a storage vessel of the processed non-marine fatty acid oil mixture after removal of the organic solvent (purified oil); C1 represents a thermal solvent removal technology (e.g. a flash evaporation vessel or a thin-film evaporator) to generate the solvent-free processed non-marine fatty acid oil mixture; F1 represents a membrane filtration unit that removes impurities from the non-marine fatty acid oil mixture; F2 represents a membrane filtration unit that allows recovery of the organic solvent by retaining the larger molecular weight compounds (e.g. impurities) that have permeated through the membrane in F1); and M1 represents a mixer technology (e.g. static inline mixer or mixing tank) that generates a solution of the organic solvent and the feed non-marine fatty acid oil mixture.

Figure 4:
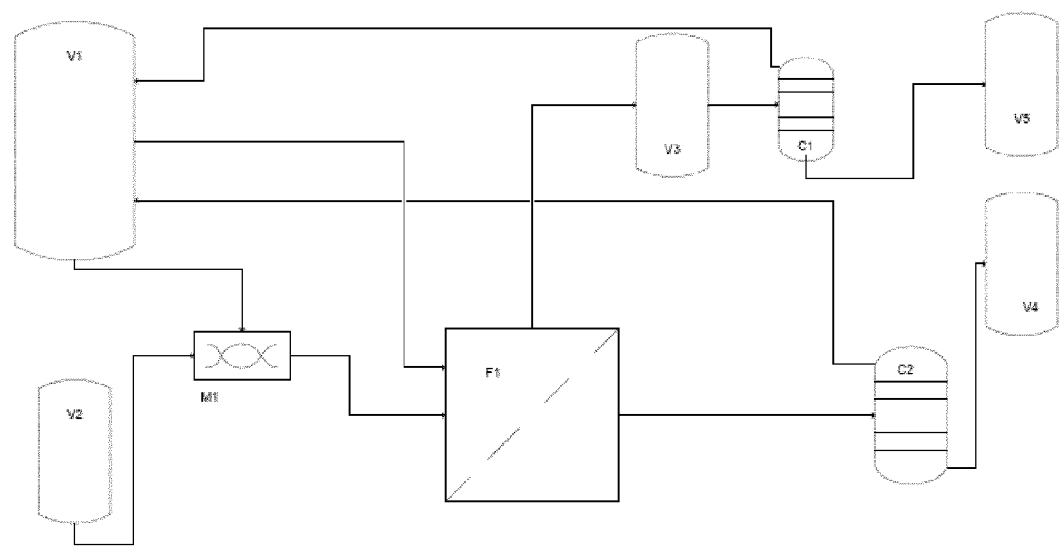
FIG. 4 is a schematic of another variation of the diafiltration system disclosed herein.

Yet another representation of a diafiltration system is illustrated in FIG. 4. In this schematic, V1 represents a storage vessel for the organic solvent; V2 represents a storage vessel for the non-marine fatty acid oil mixture feed; V3 represents a storage vessel for the solution of the processed non-marine fatty acid oil mixture (retentate); V4 represents a storage vessel for the solution of impurities removed from the non-marine fatty acid oil mixture (permeate); V5 represents a storage vessel of the processed non-marine fatty acid oil mixture after removal of the organic solvent (purified oil); C1 represents a thermal solvent removal technology (e.g. a flash evaporation vessel or a thin-film evaporator) to generate the solvent-free processed non-marine fatty acid oil mixture; C2 represents a thermal solvent recovery technology (e.g. flash evaporation or a distillation column) that allows recovery of the organic solvent by, for example, evaporating the organic solvent relative to the lower volatility species in the solution that has permeated through the membrane in F1; F1 represents a membrane filtration unit that removes impurities from the non-marine fatty acid oil mixture; and M1 represents a mixer technology (e.g. static inline mixer or mixing tank) that generates a solution of the organic solvent and the feed non-marine fatty acid oil mixture.

In at least one embodiment, solvent content in the permeate material is optionally recovered. The recovered solvent content may then be reused to dissolve the non-marine fatty acid oil mixture. By way of non-limiting example, the solvent may be recovered by a thermal process such as flash evaporation or thin-film evaporation, or it may be recovered using a membrane filtration process where the impurities are retained by the filtration membrane. In addition, in at least one embodiment, the permeate material is subjected to additional processing to recover desired components. Subsequent recovery of the desired compounds may be carried out by, for example, molecular distillation, short path evaporation, or chromatographic processes, such as HPLC (high pressure liquid chromatography) or supercritical chromatography, depending on the application.

Further, the crude non-marine fatty acid oil may be pre-processed in one or several steps before constituting the starting material in the membrane process as described above. An example of such a processing step is that the non-marine fatty acid oil mixture may be subject to washing with water and drying. The pre-processing steps of washing and drying may prevent the build-up of components in the system that can cause fouling on the membranes. As an alternative, caustic refining may be used for the same purpose.

To perform the step of washing the non-marine fatty acid oil mixture with water and drying, for example, the non-marine fatty acid oil mixture may be mixed with water by a static mixer. Separation between the non-marine fatty acid oil mixture and water may, for instance, be performed in a centrifuge or by gravimetric separation in a tank. Residual water may then be removed, for example, under vacuum in a dryer.

It is known that certain types of activated carbon can be used to remove dioxins, furans, and dioxin-like PCB's (non-ortho PCBs) from oils. Activated carbon, however, may not be effective in removing other types of pollutants. Thus, activated carbon may be used in combination, for example, with steam deodorization, since steam deodorization may reduce the concentration of some of the pollutants that are not removed by activated carbon. In general steam deodorization may be effective in removing some relatively light-boiling environmental pollutants, such as DDT and many PCBs from the non-marine fatty acid oil mixture, while molecules with higher molecular weight, such as many PBDEs, will not be effectively removed. For all types of environmental pollutants, however, the removal rate from steam deodorization will be significantly lower than what can be achieved using the disclosed method. This may, for example, be the case for triglyceride oils with a high content of polyunsaturated fatty acids (e.g. soy bean and sunflower oils), where deodorization temperatures must be kept lower than for deodorization of vegetable oils with low content of polyunsaturated fatty acids, e.g. coconut oil or palm kernel oil, to reduce thermal degradation of the polyunsaturated fatty acids, even if lower temperatures will reduce the removal rate for environmental pollutants. The choice of temperature for deodorization of such oils is often a compromise between process effect and risk of formation of degradation products. Therefore, the deodorization temperature for polyunsaturated fatty acid oils is usually about 170° C. or even higher. The process disclosed herein typically can be performed at temperatures ranging from 30 to 50° C., depending on the solubility of the non-marine fatty acid oil mixture in the solvent of choice, with excellent removal rates for pollutants. In at least one embodiment, the process may be performed at a temperature ranging from about −10° C. to about 60° C., such as, for example, from about 25° C. to about 50° C.

The process disclosed herein can be set up to achieve excellent removal rates for environmental pollutants such as, for example, PCB's, PBDE's, dioxins, furans, non-ortho PCBs, PAH's, HCH, DDT, agrochemicals and chlorinated pesticides with highly acceptable yields of triglyceride oils. Complete, or close to complete, removal of free cholesterol can be achieved. The process can also be used to achieve significant reductions in esterified cholesterol.

The advantage of the process of the present invention, in particular if the above specified hydrophobic membranes with the above specified molecular weight cut off are used, is, that a very broad spectrum of impurities, broader than in the prior art, could pass through the membrane and could be removed. Even impurities with a molecular weight that was not expected to pass through the membrane, i.e. impurities with a molecular weight of 900 Da and more, could pass through the membrane while the glyceride- and phospholipid-oils are retained. The process of the present invention, thus is much more effective than processes of the prior art. It was not expected that such a performance could be achieved. A big advantage of the process of the invention is, that said excellent results were achieved even without the above described pre-treatment steps of the crude oil.

The disclosed method can be used to treat triglyceride oils with practically any level of free fatty acids, as well as oils with high acid values, for example, oils with acid values ranging from about 0 to about 25 mg KOH/g, preferably about 0.2 to about 25 mg KOH/g.

Polyunsaturated fatty acids are known to be vulnerable to thermal degradation. Compared to other known methods for the removal of environmental pollutants and/or cholesterol, the method disclosed herein may be performed effectively at "gentle" temperature conditions. The other known methods involve higher temperatures, which may be harmful to polyunsaturated fatty acids. By way of example, membrane filtrations may be carried out at near-ambient temperature in the range −10° C. to +60° C., which are considered to be "gentle" temperatures that minimize thermal damage on temperature-sensitive materials. Temperatures above 100° C., and for example, temperatures above 150° C., are considered "harmful" for omega-3 polyunsaturated fatty acids due to the rapid occurrence of oxidation and isomerization in the oil, leading to unwanted compounds that lower the quality of the oil.

In addition, the method disclosed herein can be adapted to different requirements for the degree of reduction in pollutants desired. For example, more than 99% of environmental pollutants such as PCB's, DDT and chlorinated pesticides can be removed if desired. By way of non-limiting example, the degree of removal of a particular impurity and/or a particular natural component may be controlled by using more or less solvent to affect a diafiltration during the impurity removal process, i.e. if more solvent is used for diafiltration, then a higher removal of impurity/natural component is achieved. As additional non-limiting examples, the removal rate of a particular impurity and/or a particular natural component may be altered by increasing or decreasing the membrane area, or by increasing or decreasing the filtration times without changing the temperature. Thus, the method disclosed herein is highly flexible: removal rates may be varied to deliver different product requirements as well as to process different starting non-marine fatty acid oil mixtures (which may comprise different concentrations of non-marine fatty acid oil content, environmental pollutants, and/or natural components, for example).

In another embodiment of the invention the membrane purification process is followed by the process steps of subjecting a purified triglyceride non-marine oil to at least one transesterification reaction with a $C_1$-$C_4$ alcohol, for instance ethanol or methanol, using a catalyst under substantially anhydrous conditions, and thereafter subjecting the monoesters produced in the transesterification reaction to one or more distillations, preferably one or more molecular- or short path distillations. This combination of process steps allows for complete or close to complete removal of free cholesterol by the membrane purification step, as well as close to complete removal of esterified cholesterol in the distillation step/steps. Thereby it is possible to obtain monoesters, for instance ethyl esters, with very low concentrations of total cholesterol. Monoesters of cholesterol-containing oils that have been subject to molecular distillation without membrane purification will have higher concentrations of total cholesterol, since molecular distillation is less efficient in removing free cholesterol. In one special embodiment ethyl esters with 0-0.5 mg/g total cholesterol can be achieved. Levels of total cholesterol that can be achieved using the disclosed method will be lower than what can practically be achieved using the method of US 2006/0134303. Monoesters of oils produced using the disclosed method described in this chapter can be converted to triglycerides, for instance through reactions catalysed by commercially available enzymes (like for instance Novozyme 435), producing triglycerides concentrated in omega-3 fatty acids with very low concentrations of total cholesterol, for example 0-0.5 mg/g.

Moreover, the disclosed method can effectively remove about 90-100% of the free cholesterol and at the same time reduce esterified cholesterol to less than 50% of its initial value directly from a triglyceride or phospholipid oil in one process step. Other known processes (see, e.g., U.S. Pat. No. 7,678,930 B2/WO/2004/007655) are not effective in removing esterified cholesterol from an oil in its triglyceride form.

In at least one embodiment, the non-marine fatty acid oil mixture comprises non-marine oils, such as natural oils. In at least one such embodiment, for instance, the process disclosed herein may remove up to about 10 ppm of 2- and 3-monochlordipropanol esters of fatty acids, and even higher amounts of glycidyl esters of fatty acids.

The disclosed method also relates to a process for reducing the amount of at least one desired natural component such as fat-soluble vitamins, lipophilic hormones, phytosterols, cholesterol and/or colored components in a triglyceride or phospholipid oil. The resulting concentrate(s) comprising at least one desired natural component may be used directly after removal of the solvent, or can be used as an intermediate for further purification processes, like chromatographic methods, for instance HPLC (high pressure liquid chromatography), supercritical fluid chromatography, distillation, molecular distillation, short path evaporation, thin film evaporation, extraction using a suitable solvent, or any combination thereof.

Resulting Composition(s)

The present disclosure also relates to compositions resulting from the process disclosed herein. Such compositions may include the retentate, the purified oil, and/or the permeate material. The disclosure also relates to the purified non-marine oil (the retentate from the disclosed process) after transesterification with a $C_1$-$C_4$ alcohol to monoesters, followed by a type of distillation process forming concentrates of omega-3 fatty acid-containing monoesters.

In at least one other embodiment, the disclosed process produces a 90% reduction in at least one impurity, relative to the crude oil. In yet another embodiment, the disclosed process produces a composition, such as the permeate, comprising an increased concentration of at least one of Vitamin A, Vitamin D, Vitamin E, phytosterols (from vegetable oils), cholesterol (from animal source oils), astaxanthin, canthaxanthin, natural colors, such as beta-carotene or other carotenoids, lipophilic hormones and xanthophyll, relative to the crude oil.

In another embodiment, the disclosed process produces a purified non-marine oil comprising:
less than 2.0 mg/g total cholesterol; and/or
an acid value of less than 1 mg KOH/g; and/or
a lower level of at least one environmental pollutant compared to the non-marine fatty acid oil mixture.

In another embodiment, the crude oil is a non-marine phospholipid. In such an embodiment, the disclosed process may produce a purified oil comprising less than 2 mg/g total cholesterol and a lower level of at least one environmental pollutant compared to the crude oil. The disclosed process may also produce a composition, such as the permeate, comprising an increased concentration of astaxanthin, relative to the non-marine fatty acid oil mixture.

According to the process disclosed herein, the purified non-marine oil produced by the process may be a composition according to the European Pharmacopeia (e.g. omega-3 ethyl ester 90, omega-3 ethyl ester/triglyceride 60, fish oil monograph) criteria and specific pollutants, and comprising less than about 1 mg/g cholesterol. In a further embodiment, the process disclosed herein, optionally combined with an adsorption process comprising activated carbon and at least one up-concentration processing step, may produce a purified oil comprising above 80 wt % omega-3 fatty acids and an at least 1:2 to 2:1 EPA:DHA ratio. Moreover, high omega-3 concentrates in ethyl ester form, a combination of mono-, di- and triglyceride form, free fatty acid form or phospholipid form may also be produced according to the process.

EXAMPLES

Example 1

Colour Compound (Carotenes) Removal from Crude Palm Oil

Crude palm oil is naturally rich in colour compounds (carotenes) which are responsible for its red colour. Although they are high value compounds, they are typically destroyed in the conventional industrial oil refining process using high temperature distillation.

The process of the invention was thus tested for its ability to separate the colour compounds from a crude palm oil composition in a pressure driven filtration process. Different organic solvents were applied in the process.

Materials and Methods

The METcell cross-flow filtration apparatus (Evonik Membrane Extraction Technology Ltd., London, U.K.) consisted of an 800 mL capacity feed vessel and a pumped recirculation loop through two to five cross-flow cells connected in series. The cross-flow system is shown schematically in FIG. 1. The mixing in the cross-flow cells was provided by flow from the gear pump: the flow was introduced tangentially to the membrane surface at the outer diameter of the membrane disk and followed a spiral flow pattern to a discharge point at the center of the filtration cell/disk. The nanofiltration membrane disks were conditioned with the experimental solvent at the operating pressure and 30° C. until a constant flux was obtained, to ensure that any preservatives/conditioning agents were washed out of the membrane, and maximum compaction of the membrane was obtained.

The test mixture was then permeated across each conditioned membrane disk at the desired operating temperature and pressure. Samples of feed permeate and retentate solutions were collected for analysis.

Membrane Performance

Membrane performance was evaluated by observing (i) the permeate flux through the membrane during a fixed period of time; and (ii) the rejection values of the glycerides and impurities in the permeate stream. By using these parameters, the glycerides and impurities separation efficiency was evaluated.

(i) The flux of the solvent, J (measured in L/m²·hr or LMH), was calculated using the following equation:

$$\text{Flux}, J = \left(\frac{V_P}{A_m t}\right) \quad \text{(Equation 1)}$$

where $V_p$ is the volume (L) permeated through the membrane; $A_m$ is the membrane area (m²); and t (hr) is the time taken for the volume to permeate.

(ii) Rejection of a species is used to measure the ability of the membrane to separate that species between the permeate and retentate solutions. It is defined by the following equation:

$$\text{Rejection}(\%) = \left(1 - \frac{\text{Permeate concentration}}{\text{Retentate concentration}}\right) \times 100\% \quad \text{(Equation 2)}$$

Table 1 lists the membranes used for the study, and their respective nominal molecular weight cut-offs.

TABLE 1

Membrane used

| Entry | Membrane Type | Membrane Nominal Molecular Weight Cut-Off (g/mol) | Short Name |
|---|---|---|---|
| 1 | DuraMem ™ | 500 | DM 500 |
| 2 | DuraMem ™ | 500 | DM S XP1 |

Analytical Methodology

In order to perform the membrane separation of the crude palm oil composition, the palm oil was diluted with a suitable organic solvent. This is due to the high viscosity of the oil. The organic solvent should be food grade and form a homogenous mixture with the oil.

The percentage of oil in the retentate and permeate samples was used to calculated the "dry weight" rejection of the membranes. The concentration of oil was determined after evaporating the solvent in the samples. Rotary evaporation (Rotavap) under vacuum was used to "dry" the sample with a water bath temperature of 40° C.

Colour compounds rejection was established by comparing the colour intensity of the permeates and retentate samples. This was measured through visible light absorbance spectroscopy at 540 nm.

Results

Ethyl acetate was used as solvent in this study.

Table 2 presents the data from the screening test using ethyl acetate as a solvent.

TABLE 2

Screening experiment palm oil/ethyl acetate
Palm oil/Ethyl acetate

| | Feed | | | | |
|---|---|---|---|---|---|
| Membrane | Oil, vol | EA, vol | Flux, LMH | Dry weight rejection, % | "Color" rejection, % |
| DM XP1 | 1 | 3 | 29 | 96.4 | 90.4 |
| DM 500 | 1 | 3 | 64 | 88.1 | 81.5 |

Industrially relevant permeate flux values are obtained. For ethyl acetate/palm oil the superior rejection difference and a high (>95%) rejection of dry weight (essentially the glyceride content of the oil) indicates that ethyl acetate would be a preferred process solvent, and DuraMem S XP1 (DM XP1) would be the preferred membrane for a process to remove the colour compounds from the palm oil.

Example 2

Phenolic Compounds Removal from Extra Virgin Olive Oil

Extra virgin olive oil is a plant oil naturally rich in phenolic compounds, including polyphenolic compounds, that provide excellent antioxidant activity but are also responsible for the oil's bitter taste.

The process of the invention was tested for its ability to separate the valuable phenolic compounds from the extra virgin olive oil composition in a pressure driven filtration process. Ethyl acetate was used to provide a solution of the olive oil.

Table 3 lists the membranes used for the study, and their respective nominal molecular weight cut-offs.

TABLE 3

Membrane used

| Entry | Membrane Type | Membrane Nominal Molecular Weight Cut-Off (g/mol) | Short Name |
|---|---|---|---|
| 2 | DuraMem ™ | 500 | DM 500 |
| 3 | DuraMem ™ | 500 | DM S XP1 |

Analytical Methodology

The extra virgin olive oil composition was diluted with a suitable organic solvent as described in Example 1. The "dry weight" rejection of the membranes was also determined as described in Example 1.

Phenolic compounds concentration in the olive oil was established after liquid-liquid extraction with methanol/water (80/20, vol %) mixture. The hydrophilic solution was than analysed using the Colin-follein reagent and the light absorbance of the sample at 380 nm was measured.

Results

Table 4 presents the data from the screening test using ethyl acetate as a solvent. This data shows that the membrane tested offers industrially relevant permeate fluxes and extremely low rejections of the phenolic compounds (17%). The membrane also exhibits relatively high rejections of dry weight (in essence the glyceride content of the oil).

TABLE 4

Screening experiment olive oil/ethyl acetate
Olive oil/Ethyl acetate

| | Feed | | | | |
|---|---|---|---|---|---|
| Membrane | Oil, vol | EA, vol | Flux, LMH | Dry weight rejection, % | Phenols rejection, % |
| DM 500 | 1 | 2 | 16 | 85 | 17 |

In a second part of this experiment, a constant volume diafiltration experiment was carried out using the DM XP1 membrane with a olive oil/ethyl acetate solution. Ethyl acetate was also used as the diafiltration ("washing") solvent for the process.

Five diafiltration volumes (DVs) of the feed solution were permeated through the membrane in order to demonstrate the reduction of the phenolic compounds content in the retentate solution. (One diafiltration volume is defined to equal the hold-up volume of liquid in the plant.) The diafiltration was operated as a constant-volume diafiltration—i.e. the diafiltration solvent was added to the system at a rate equalling the permeate flowrate, thus maintaining a constant volume in the filtration system Table 5 summarises the results of the diafiltration experiment of olive oil:ethyl acetate (volume ratio 1:2, respectively) feed solution. As can be seen the combination of DuraMem S XP1 with an ethyl acetate solution of the olive oil, when operated in crossflow during a diafiltration process of capable of reducing the impurity (phenols) content of the olive oil. To achieve a more enhanced reduction in phenols content, additional diafiltration volumes of solvent would be permeated to further reduce the content of phenols in the retentate.

TABLE 5

Diafiltration results for olive oil/ethyl acetate

| | Flux, LMH | Dry weight rejection, % | Phelols rejection,% | Phenols reduction,% |
|---|---|---|---|---|
| Start | 16.4 | 96.8 | 76.1 | |
| DV 1 | 13.3 | 96.6 | 76.8 | 17.0 |
| DV 2 | 12.2 | 97.1 | 81.5 | 29.2 |
| DV 3 | 13.3 | 97.2 | 80.2 | 40.8 |
| DV 4 | 13.3 | 96.8 | 70.2 | 55.7 |
| DV 5 | 13.3 | 96.8 | 70.1 | 59.2 |

Example 3

Vitamin E Removal from Sunflower Oil

Sunflower oil is the non-volatile oil obtained by pressing sunflower seeds. Sunflower oil is light in taste and appearance with a high vitamin E and triglyceride content.

The process of the invention was tested for its ability to separate α-tocopherol (vitamin E) from a crude sunflower oil composition in a pressure driven filtration process. To evaluate the filtration process disclosed herein, sunflower oil may be spiked with α-tocopherol prior to nanofiltration.

Materials and Methods

Methods and materials were used as in example 1.

Table 6 lists the membranes used for the study, and their respective nominal molecular weight cut-offs.

TABLE 6

Membrane used

| Entry | Membrane Type | Membrane Nominal Molecular Weight Cut-Off (g/mol) | Short Name |
|---|---|---|---|
| 1 | DuraMem ™ | 500 | DM 500 |
| 2 | DuraMem ™ | 500 | DM S XP1 |

Analytical Methodology

The crude sunflower oil composition was diluted with a suitable organic solvent as described in Example 1. The "dry weight" rejection of the membranes was also determined as described in Example 1.

α-tocopherol was analysed by HPLC using an Agilent 1100 series HPLC system with an UV detector using a YMC-Pack™ PVA-Sil™ HPLC column (150×4.6 mm, 120 A). For the analysis, 1 ml of sample was evaporated under a stream of argon gas and then mixed with 1 ml of hexane to constitute the sample for injection on the HPLC.

HPLC Parameters

Column temperature: 25° C.

Mobile phase: 1:200 IPA:Hexane

Flow: 1.0 ml/min.

Run time: 7 min.

Injection volume: 100 μl

Wavelength: UV 292 nm

α-tocopherol rejection was established by comparing the area of the permeates and retentate samples.

Results and Discussion

Membrane Performance

Membrane performance was evaluated by observing (i) the permeate flux through the membrane during a fixed period of time; and (ii) the rejection values of the α-tocopherol and glycerides analogue to example 1.

Screening

Prior to characterising the membranes, they were first conditioned with pure solvent at the desired filtration pressure to remove the conditioning agent present in the membranes. Afterwards, any residual solvent was drained, and a fixed volume of crude sunflower oil solution and solvent was mixed and placed in the feed tank. Ethyl acetate was selected as the process solvent for this work.

The membranes were then tested in continuous cross-flow at the specified operating pressure and temperature. Permeate and retentate samples were collected after 4 hours of filtration. Retentate and permeate samples were then analyzed for each membrane to determine membrane performance. Table 7 presents the data from the screening test using ethyl acetate as a solvent.

TABLE 7

Screening experiment sunflower oil/EA

| Membrane | Feed Oil, vol | Feed EA, vol | Flux, LMH | Dry weight rejection, % | α-tocopherol rejection, % |
|---|---|---|---|---|---|
| DM 500 | 1 | 3 | 27.0 | 97.1 | 87.4 |
| DM S XP1 | 1 | 3 | 22.7 | 97.1 | 75.6 |

Both the DM500 and DM S XP-1 membranes exhibit industrially relevant permeate flux values as well as significant difference in rejection between the dry weight and α-tocopherol rejection values. In the case of the DM S XP-1 membrane, the combination of a larger rejection difference and a high (>95%) rejection of dry weight (essentially the glyceride content of the oil) indicates that DM S XP-1 would be the preferred membrane for a process to remove impurities, in this case vitamin E, from the sunflower oil.

The invention claimed is:

1. A process for reducing at least one impurity and/or for producing a concentrate comprising an impurity from a non-marine fatty acid oil mixture, the process comprising:
   (a) mixing (i) a crude non-marine fatty acid oil mixture comprising an impurity that has not been subjected to solvent extraction with (ii) a miscible organic solvent to form a solution;
   (b) passing the solution across at least one selective membrane, wherein a retentate forms comprising oil, and a permeate forms comprising the impurity; and
   (c) removing the miscible organic solvent from the retentate to form a purified non-marine oil,
   wherein the impurity in the purified non-marine oil is reduced compared to the non-marine fatty acid oil mixture,
   wherein the non-marine fatty acid oil mixture comprises at least one non-marine oil selected from the group consisting of a triglyceride oil and a phospholipid oil; and
   wherein the selective membrane has a rejection $R_{TG}$ of the at least one non-marine oil selected from the group consisting of a triglyceride oil and a phospholipid oil, which is greater than a membrane rejection $R_{Imp}$ of the impurity.

2. The process of claim 1,
wherein:
   (i) the passing of the solution across the at least one selective membrane comprises diafiltration, cross-flow/tangential-flow filtration, or a combination of dia- and cross-flow filtration;
   (ii) the process is performed at a temperature ranging from about −10° C. to about 60° C.;
   (iii) the solution is passed across the at least one selective membrane at a filtration pressure ranging from about 5 bar to about 70 bar;
or any combination of (i), (ii) and (iii).

3. The process of claim 1,
further comprising:
   (i) contacting the purified non-marine oil with an absorbent or adsorbent;
   (ii) recovering a solvent from the permeate and/or from the retentate;
   (iii) repeating the mixing, passing, and removing for a period of time ranging from about 10 minutes to about twenty hours;
or any combination of (i), (ii) and (iii).

4. The process of claim 1,
further comprising passing the permeate across at least one second selective membrane to form a second retentate comprising oil and a second permeate comprising an impurity/natural compound, wherein the at least one second selective membrane may be the same as, or different from, the at least one selective membrane.

5. The process of claim 1,
wherein the non-marine fatty acid oil mixture has an acid value greater than or equal to 10 mg KOH/g,
and/or
wherein the non-marine fatty acid oil mixture comprises greater than 20% of the at least one non-marine oil selected from the group consisting of a triglyceride oil and a phospholipid oil.

6. The process of claim 5,
wherein the non-marine fatty acid oil mixture is deacidified by membrane filtration.

7. The process of claim 1,
wherein:
   (i) the non-marine fatty acid oil mixture comprises from about 10% to about 30% by weight of an omega-3 fatty acid;
   (ii) the non-marine fatty acid oil mixture comprises a vegetable oil;
   (iii) the non-marine fatty acid oil mixture comprises oil from non-marine algae;
   (iv) the non-marine fatty acid oil mixture comprises an animal fat or oil;
or any combination of (i), (ii), (iii) and (iv).

8. The process of claim 1,
wherein the impurity is selected from the group consisting of a free cholesterol, an esterified cholesterol, a sterol, an esterified sterol, a phenolic compound, a component that creates an unwanted smell and/or taste in the oil mixture, Vitamin A, Vitamin D, Vitamin E, astaxanthin, canthaxanthin, and another carotenoid;
and/or
wherein the impurity is an environmental pollutant.

9. The process of claim 1,
wherein the process reduces a level of the impurity in the purified non-marine oil by 50% to about 100% compared to the non-marine fatty acid oil mixture.

10. The process of claim 1,
wherein the miscible organic solvent is selected from the group consisting of an aliphatic hydrocarbon, an aromatic hydrocarbon, a ketone, an ester and an alcohol.

11. The process of claim 1,
wherein the at least one selective membrane comprises at least one material selected from the group consisting of polyethylene, polypropylene, polytetrafluoroethylene (PTFE), polyvinylidene difluoride (PVDF), polysulfone, polyethersulfone, polyacrylonitrile, polyamide, polyimide, polyamideimide, polyetherimide, cellulose acetate, polyaniline, polypyrrole, polyetheretherketone (PEEK), and polybenzimidazole.

12. The process of claim 11,
wherein the at least one selective membrane has a molecular weight cut-off ranging from about 150 g/mol to about 1,500 g/mol;
and/or
wherein the at least one selective membrane provides a contact angle for water of more than 70° at 25° C., as measured using a static sessile drop method.

13. The process of claim 1,
wherein the permeate comprises at least one member selected from the group consisting of a free cholesterol, an esterified cholesterol, a sterol, an esterified sterol, a phenolic compound, an oxidation product, a component that creates an unwanted smell and/or taste in the oil mixture, Vitamin A, Vitamin D, Vitamin E, astaxanthin, canthaxanthin, and another carotenoid, at an increased concentration compared to the non-marine fatty acid oil mixture.

14. The process of claim 1, which produces the concentrate comprising the impurity, further comprising purifying the concentrate by at least one method selected from the group consisting of HPLC, supercritical fluid chromatography, distillation, molecular distillation, short path evaporation, thin film evaporation, extraction, and absorption.

15. The process of claim 1, wherein the non-marine fatty acid oil mixture comprises a triglyceride oil.

16. The process of claim 1, wherein the non-marine fatty acid oil mixture comprises a phospholipid oil.

17. The process of claim 1, wherein the non-marine fatty acid oil mixture comprises a triglyceride oil and a phospholipid oil.

* * * * *